UNITED STATES PATENT OFFICE.

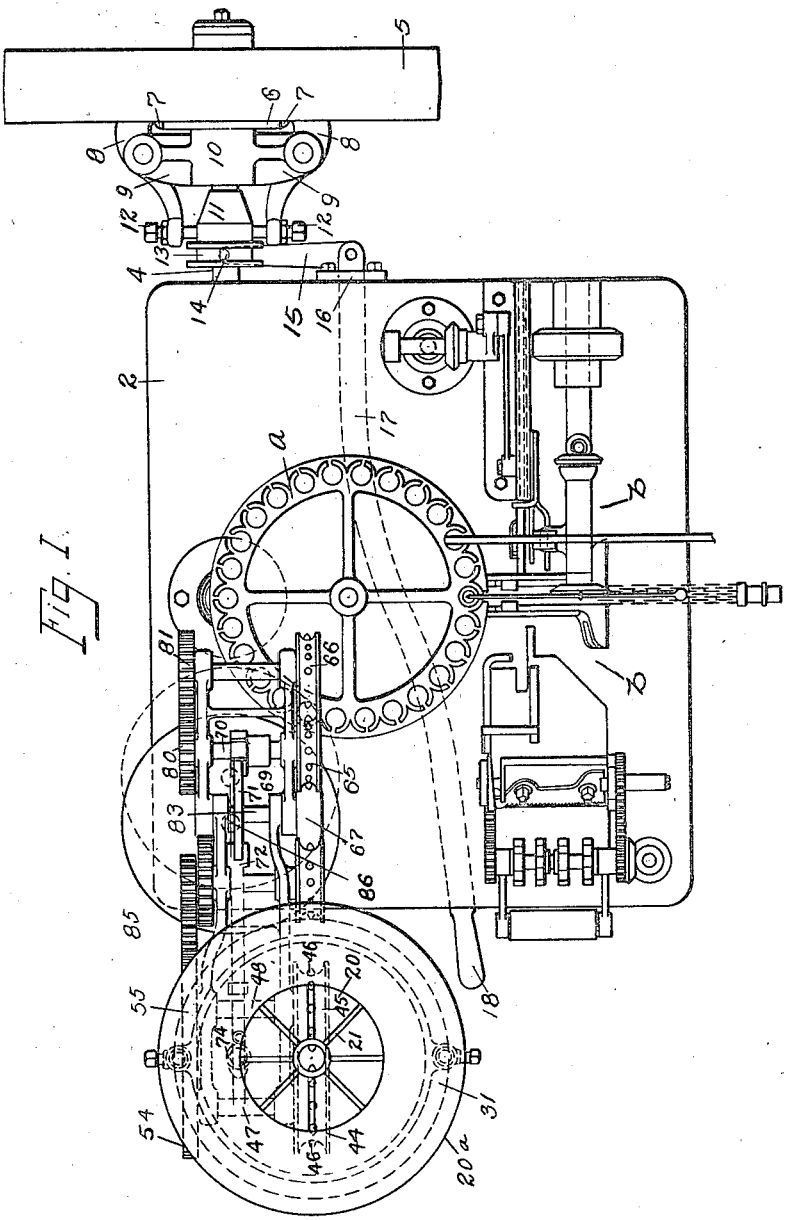

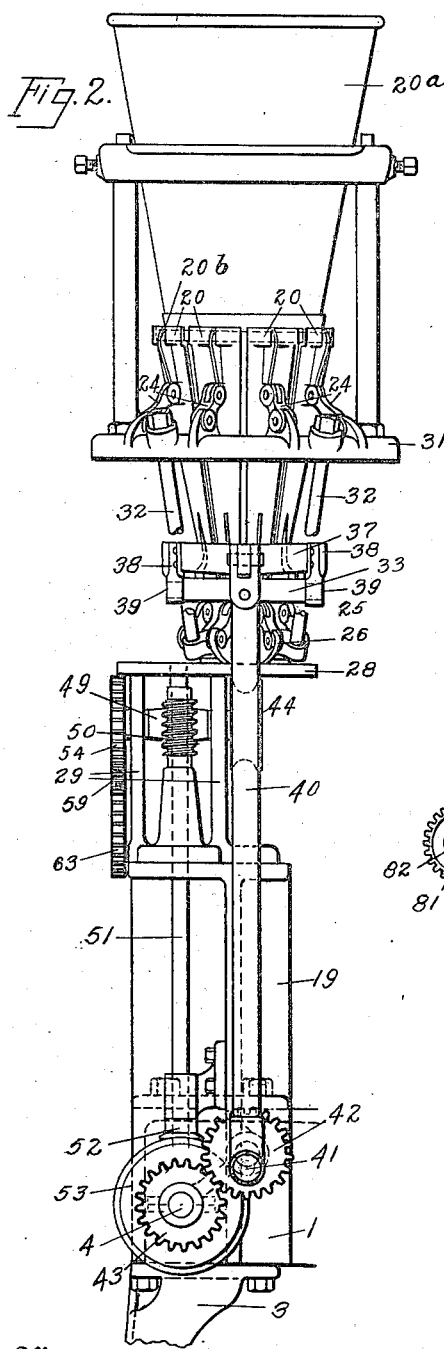
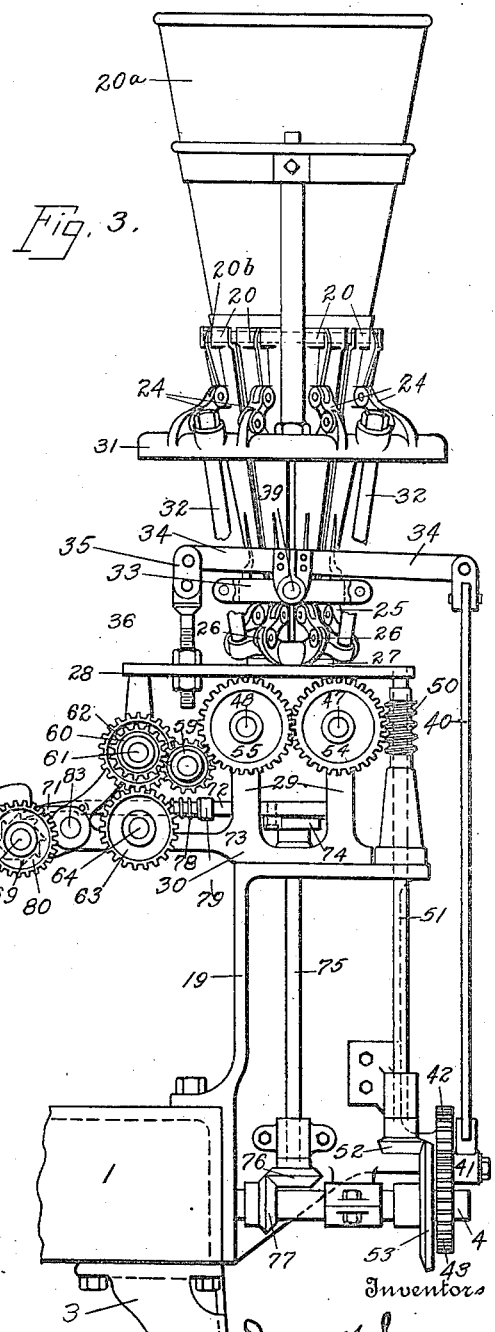

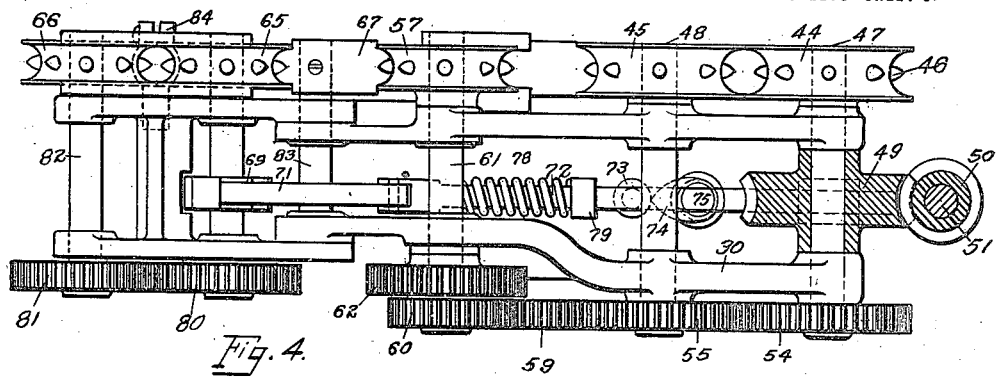
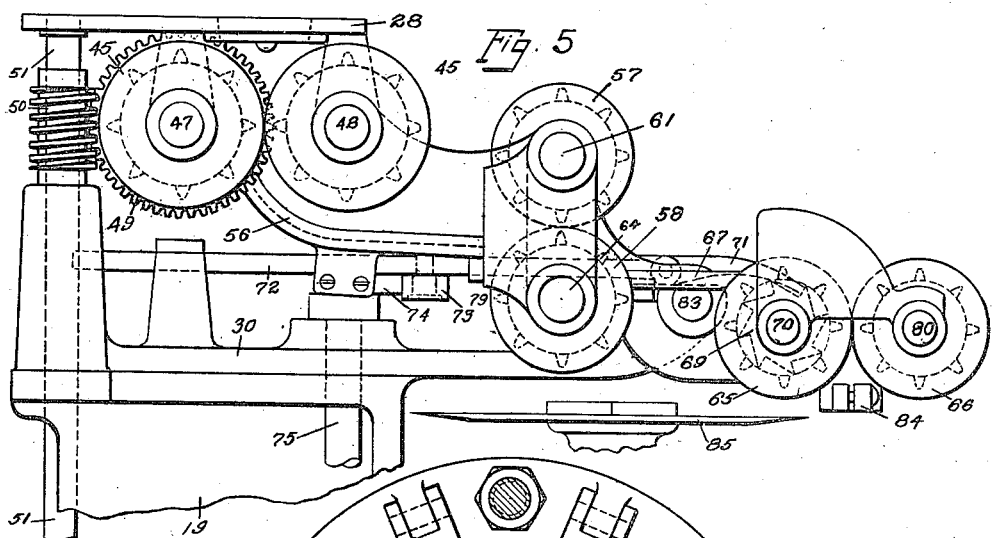
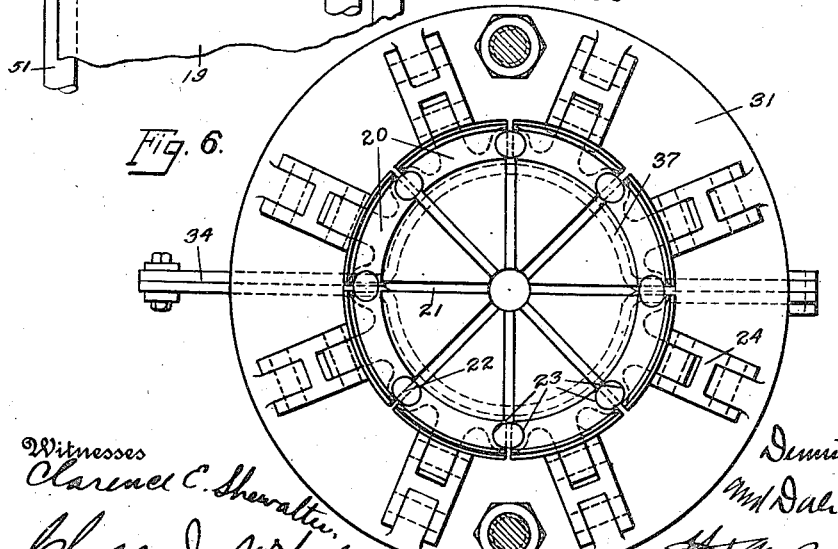

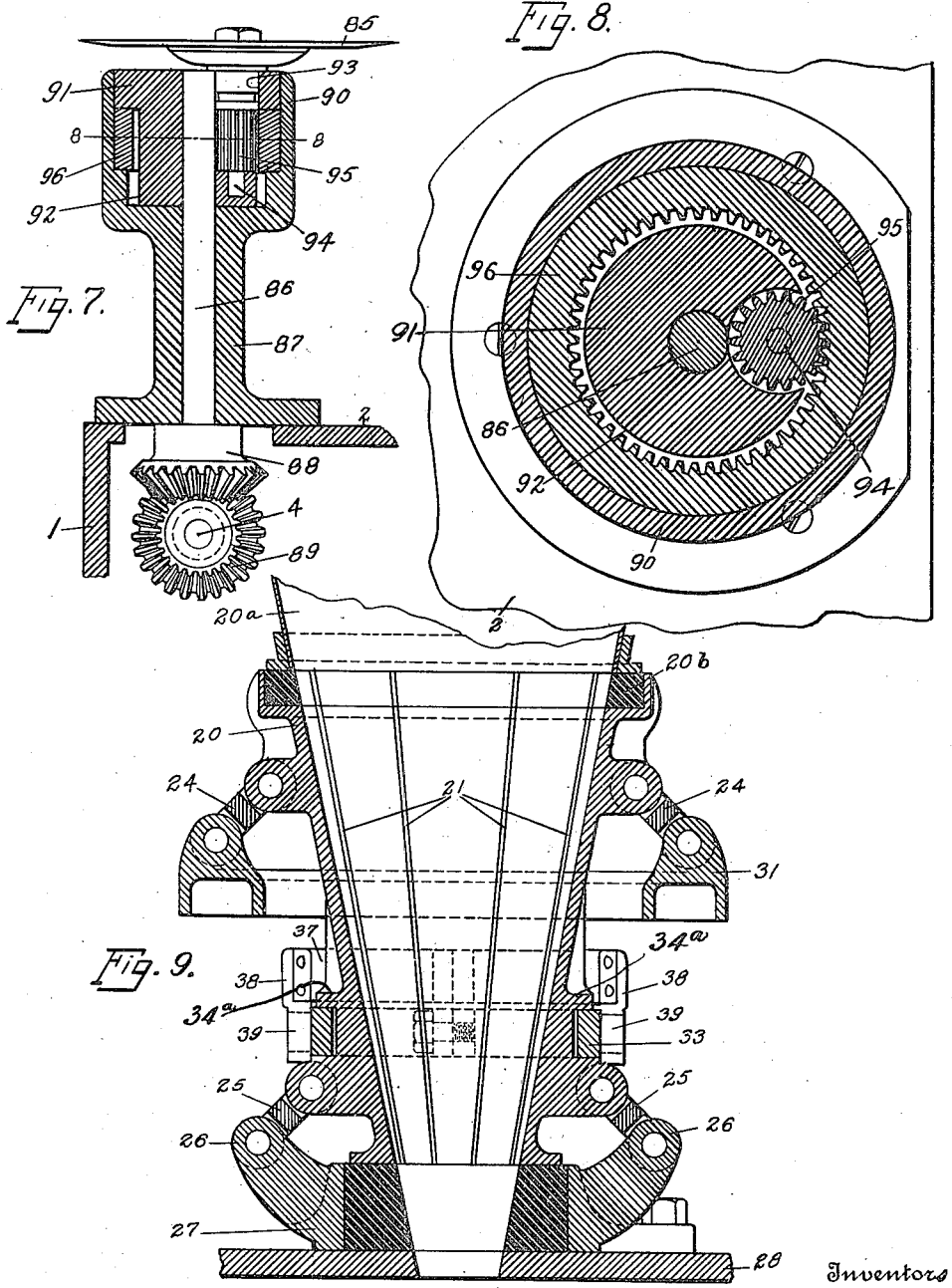

DENNIS T. IGOU AND DALE C. IGOU, OF SPRINGFIELD, OHIO, ASSIGNORS TO THE IGOU MANUFACTURING COMPANY, OF SPRINGFIELD, OHIO, A CORPORATION OF OHIO.

CANDY-MACHINE.

1,173,275.   Specification of Letters Patent.   Patented Feb. 29, 1916.

Original application filed September 19, 1910, Serial No. 582,671. Divided and this application filed May 4, 1915. Serial No. 25,697.

*To all whom it may concern:*

Be it known that we, DENNIS T. IGOU and DALE C. IGOU, citizens of the United States, residing at Springfield, in the county of Clark and State of Ohio, have invented certain new and useful Improvements in Candy-Machines, of which the following is a specification.

This invention relates to improvements in candy wrapping machines, and more particularly to that part of the same which receives the batch of candy and prepares it for the wrapping mechanism; this application being a division of our pending application Serial Number 582,671, filed September 19th, 1910.

The object of the invention is to provide a machine of the character referred to in which the mechanism will be simple in construction and effective in operation, and also in which the confection will at all times during its passage through the devices, be readily accessible.

In the accompanying drawings,—Figure 1 is a top plan view of a machine employing our improved devices. Fig. 2 is an end elevation of the batch supporting and reducing mechanism. Fig. 3 is a side elevation of the same. Fig. 4 is a top plan view of the feeding and reducing rollers. Fig. 5 is a side elevation of the same. Fig. 6 is a top plan view of the diminisher with the hopper removed. Fig. 7 is a sectional detail view of the cutter and its operating mechanism. Fig. 8 is a transverse sectional view of the same taken on the line 8—8 of Fig. 7. Fig. 9 is a vertical section of the reducing receptacle.

In the accompanying drawings, the construction which we have shown, comprises a support adapted to receive a batch of candy in a plastic condition and deliver the same to suitable reducing and feeding mechanism, which draws the candy into a bar of suitable and uniform diameter and feeds this bar to a cutting device which divides the same into small portions or confections. After this, the confections are delivered to suitable wrapping mechanism, this wrapping mechanism being more fully set forth in our pending application referred to and forms no part of the present invention.

The mechanism may be arranged and supported in any suitable manner and is shown mounted upon a main frame 1, comprising a flat top or supporting surface 2, mounted upon vertical standards 3. Extending transversely to the main frame near the rear end thereof and below the top thereof, is a main driving shaft 4 which is journaled in the side members of the main frame and extends for some distance on the opposite sides of that frame. A suitable driving wheel, such as the belt wheel 5, is loosely mounted on that portion of the shaft 4 which projects beyond one side of the main frame and is adapted to be connected to and disconnected from said shaft by suitable clutch mechanism under the control of the operator. This mechanism is here shown as comprising a friction drum 6 rigidly secured to the driving wheel and adapted to coöperate with friction shoes 7 carried by levers 8, pivotally mounted upon lugs 9, carried by a sleeve 10. This sleeve is rigidly secured to the shaft 4 and the ends of the levers 8, on that side of the sleeve opposite the driving wheel 5, extend some distance beyond the end of the sleeve and are adapted to be actuated by a cone 11 slidably mounted upon the shaft 4. The ends of the levers are preferably provided with adjustable stops 12 arranged to engage the cone 11 and regulate the amount of pressure exerted on the shoes 7. The cone can be actuated in any suitable manner, but, as here shown, is provided with the usual groove collar 13 into which extend pins 14 carried by the arms of a yoke 15. This yoke is pivotally mounted upon a bracket 16 rigidly secured to one side of the main frame 1 and has rigidly secured thereto an arm 17 which extends transversely of the main frame and is provided on the opposite side thereof with a handle 18, by means of which the arm 17, yoke 15, and cone 11, may be actuated. From this main driving shaft 4, all of the mechanism is operated.

The support for the batch of candy and the reducing and feeding mechanism are here shown as supported on a bracket 19 rigidly secured to one side of the main frame, in the present instance that side opposite the side on which the driving wheel is mounted, and at a point near the rear end thereof. It will be understood that in this description, the direction in which the confections move in their passage through the machine, is considered the forward direction, and, consequently, the front end of the machine is the end at which the wrapped candy is discharged and the rear end is the end at which the batch is supported. The support employed in the present machine also constitutes a diminisher which so shapes the lower end of the batch as to enable it to be acted upon by the reducing and feeding rollers. This support or diminisher comprises a cone-shaped receptacle arranged in a substantially vertical position and open at both its upper and its lower ends. The walls of the receptacle are made up of a series of tapered sections or staves 20 which are so supported as to be movable toward and away from a vertical line extending centrally to the receptacle and also to have a vertical movement, the combined movements serving to compress the batch of candy into a cone-shape and to draw the same downward toward the reducing and feeding rollers. To permit of these movements, the several sections 20 are arranged short distances apart and the spaces between the adjacent edges of the sections are closed by means of strips of resilient material. In the present instance, we have employed strips of soft rubber, as indicated at 21. These strips are provided with thickened central portions 22 extending beyond the opposite sides of the body of the strip and adapted to enter recesses 23 formed in the edges of the sections of the diminisher. The movement of the sections relative one to the other is slight and the resiliency of the soft rubber enables the same to be contracted and to expand with the movements of the sections, thereby keeping the spaces between the sections closed and preventing the candy from entering the same. A hopper 20$^a$ is rigidly supported above the diminisher and a gasket 20$^b$ of rubber or other resilient material is interposed between the upper ends of the sections 20 and the hopper to permit of the vertical movement of the sections and prevent the material escaping between the hopper and diminisher. Similar gaskets are placed between the lower ends of the sections and the supporting member.

The desired movements may be imparted to the several sections 20 of the diminisher in any suitable manner and we have here shown one method of imparting these movements to the sections which we have found satisfactory. Each section has pivotally connected thereto, near its upper and lower ends, links 24 and 25, respectively. The links 25, which are connected at one end to the sections 20 near their lower ends, are connected at their opposite ends to pivot lugs 26 carried by and preferably formed integral with an annular supporting member 27. This supporting member is mounted on a plate 28 carried by two side members 29 of a bracket 30, which, in turn, is mounted upon the bracket 19 and which serves as a support both for the diminisher and for the reducing and feeding devices. The links 24 which are connected to the upper ends of the sections 20 are pivotally connected at their outer ends to an annular support 31 which extends about the diminisher and which is connected to the lower annular support 27 by means of rods 32. Vertical movement is imparted to the sections of the diminisher through the medium of a ring 33 extending about the lower end of the diminisher immediately above the inner ends of the lower series of links 25 and located between the link lugs 26 and projections 34$^a$ integrally formed with each section of the diminisher, the space between the link lugs and said projection being such as to snugly accommodate the ring but at the same time allow for a movement of the parts; the said lugs and projections forming in effect a groove way about the diminisher. This ring is actuated by means of a lever 34 pivotally connected at one end to a fixed part of the machine. In the present instance, this connection is made by means of a link 35 pivotally connected at one end to the adjacent end of the lever and pivotally connected at its other end to a part, such as an arm 36, which is rigidly secured to the plate 28 of the bracket 30. The lever 34 is provided with an annular portion, as indicated at 37, which extends loosely about the diminisher just above the ring 33 and is connected to that ring by means of bearing lugs 38 depending therefrom and arranged to receive trunnions 39 rigidly secured to the opposite sides of the ring 33. The movable end of the lever 34 is connected by means of a pitman 40 with a crank pin 41 carried by a gear 42 mounted on the bracket 19 and meshing with a second gear 43 mounted on the driving shaft 4. It will be apparent that the movement of the lever 34 will raise and lower the ring 33, and the movement of the ring will cause a corresponding movement of the sections 20 of the diminisher. The vertical movement of the sections causes the links 24 and 25 to be moved about their pivotal connections to the fixed supports, and, consequently, the sections are moved inward or outward a distance corresponding to the movement of the links about their pivotal centers. In this manner there is successively imparted to the sections an inward and downward movement and an upward and outward movement. The inward and downward movements serve to compress and draw downward the lower end of the batch of candy. The upward and outward movements of the sections increase the diameter of the diminisher and permit the batch of candy to drop downward. In this lower position it is again engaged by the sections as they again move inward and downward.

The supporting plate 28 of the bracket 30 has an opening formed therein immediately beneath the opening in the annular support 27 and supported from the bracket beneath this opening are two feeding and reducing rollers 44 and 45. These rollers are of a known construction and each is provided in its periphery with a groove and the two rollers are arranged with their axes in substantially the same horizontal plane and with their peripheries in engagement, and, consequently, a vertical passage is formed between the rollers. The arrangement of the rollers is such as to bring this passage directly beneath the opening in the lower end of the diminisher. The rollers may, if desired, be provided with pins 46 arranged within the grooves to increase the gripping action of the rollers and facilitate the feeding of the candy and the drawing of the same from the batch. These rollers are here shown as mounted upon shafts 47 and 48 journaled in the side members 29 of the bracket 30, which bracket extends inwardly toward the main frame. The shafts extend beyond the two side members 29 and the feeding rollers 44 and 45 are mounted upon the projecting ends of the shafts on one side of the bracket and in this manner are supported in a position in which they are readily accessible. The shaft 47 has mounted thereon between the two side members of the frame, a worm wheel 49 which meshes with a worm 50 mounted on a vertical shaft 51 which, in turn, is mounted in bearings carried by the bracket 19 and has at its lower end a bevel pinion 52 which meshes with a bevel gear 53 mounted on the driving shaft 4. The shafts 47 and 48 have mounted on those ends opposite the ends on which the rollers are mounted intermeshing gears 54 and 55, by means of which movement is imparted from the shaft 47 to the shaft 48 and the two rollers 44 and 45 are caused to rotate in opposite directions.

The bar of candy as it passes between the rollers 44 and 45, engages a curved guide or chute 56 and is guided thereby to a second pair of feeding and reducing rollers 57 and 58. These rollers are similar in construction to the rollers 44 and 45, but are somewhat smaller and have their axes arranged in a vertical plane so as to present a substantially horizontal opening for the passage of the bar of candy. They are preferably driven from the gear 55 which rotates the shaft 48 of the roller 45, this being accomplished by means of an intermediate pinion 59 meshing with the gear 55 and with a gear 60 mounted on a shaft 61 of the upper roller 57. A second gear 62, also mounted on the shaft 61, meshes with a gear 63 mounted on a shaft 64 of the lower roller, thereby rotating these rollers in opposite directions.

The bar of candy passes from the second pair of reducing and feeding rollers 57 to the third and final pair of rollers. These rollers, which are indicated at 65 and 66, have their axes arranged in a substantially horizontal plane so that the bar is discharged therefrom in a substantially vertical plane. The space between the second and third pair of rollers is bridged by a chute 67 and a suitable guard is mounted upon the side members of the frame, extends above the path of the bar of candy and serves to direct the same downward between the two rollers 65 and 66. This third pair of rollers is actuated intermittently so as to feed the bar of candy forward equal distances at fixed intervals. This intermittent movement of the rollers may be accomplished in any suitable manner, but we have here shown a pawl and ratchet mechanism for imparting this movement to the roller 65. This mechanism comprises a ratchet wheel 69 mounted on a shaft 70 of the roller 65. A pawl 71 has one end arranged to engage the teeth of the ratchet 69 and is pivotally connected at its other end to the adjacent end of a reciprocating rod 72 which is slidably mounted in suitable bearings supported by the side members 29 of the frame 30 and has between its ends a roller 73 arranged in the path of a cam 74 mounted on the upper end of a vertical shaft 75 journaled in bearings in the brackets 19 and having at its lower end a bevel pinion 76 meshing with a corresponding pinion 77 on the drive shaft 4. Thus, at each revolution of the shaft 75, the rod 72 and pawl 71 will be moved forward and the ratchet wheel and the roller 65, with which it is connected, rotated through the space of one tooth. A spring 78 is coiled about the rod 72 and is confined between one of the bearings for the rod and a collar 79 rigidly secured to the rod and serves to retract the rod after each forward movement thereof. A movement corresponding to the movement of the roller 65 is imparted to the roller 66 by means of a gear 80 mounted on the shaft 70 of the roller 65 and meshing with a similar gear 81 mounted on a shaft 82 of the roller 66. Those portions of the side members 29 of the frame 30, in which the shafts 70 and 82 of the rollers 65 and 66, respectively, are journaled, are pivotally connected to the main portions of the side members of that frame, as shown at 83, thereby enabling the end of the frame and the rollers 65 and 66 to be moved into a substantially vertical position to permit access to the parts arranged within the same and to be herein described. A tube or chute 84 is preferably provided to form a guide for the bar of candy as it leaves the last pair of rollers 65 and 66.

A suitable cutting device is arranged to act upon the bar of candy as it leaves the feeding and reducing rollers and to divide the same into small portions or confections. This cutting device is here shown as a rotary disk cutter 85 connected with and arranged eccentrically to the upper end of a vertical shaft 86 journaled in a bearing 87 mounted on the top 2 of the main frame 1 and having at its lower end a bevel pinion 88 meshing with a corresponding pinion 89 on the driving shaft 4. Mounted on the upper end of the bearing 87 and preferably formed integral therewith is a housing 90 substantially cylindrical in shape and having its upper end open. Mounted within the housing 90 and rigidly secured to the upper end of the shaft 86 is a cylindrical block 91 having a reduced portion 92. The block 91 also has a vertical bearing 93 in which is journaled a shaft 94 carrying the cutter 85. Rigidly secured to the shaft 94 at a point adjacent the reduced portion 92, is a pinion 95 which meshes with a rack 96 carried by the inner wall of the cylindrical housing 90 and fixed against movement relative thereto. Thus, it will be seen that as the shaft 86 is rotated, the disk cutter 85 will revolve about the axis of that shaft and will also rotate about the axis of the shaft 94. This disk is so arranged that each revolution thereof about the shaft 86 will carry it across the lower end of the discharge tube 84 and cause it to sever that portion of the bar of candy which extends beyond the end of that tube. The cutter passes close to the lower end of the tube and the latter serves to hold the bar of candy against displacement when engaged by the cutter and enables a clean, smooth cut to be made.

The confections which are severed from the bar are received by a carrier, $a$, which conveys the same to the point at which they are delivered to the wrapping mechanism, $b$, a portion only of which is shown in Fig. 1, but which is more fully described in our pending application referred to.

Having thus described our invention, we claim:—

1. In a machine of the character described, the combination, with a support for a batch of candy, reducing and feeding devices for drawing the candy from said support and forming the same into a bar, and a tube through which said bar of candy is discharged, of a bearing, a shaft journaled in said bearing, a housing surrounding said shaft and held against movement, a block mounted in said housing and rigidly secured to said shaft, a secondary shaft journaled in said block, a pinion carried by said secondary shaft, a rack secured to the inner wall of said housing and meshing with said pinion, and a disk cutter secured to the upper end of said secondary shaft.

2. In a machine of the character described, the combination, with a support for a batch of candy, reducing and feeding devices for drawing the candy from said support and forming the same into a bar, and a tube through which said bar of candy is discharged, of a vertical bearing having an enlarged upper portion constituting a housing, an annular rack secured to the inner wall of said housing, a block mounted in said housing having an annular reduced portion to receive said rack and rigidly secured to said shaft, a secondary shaft rotatably mounted in said block, a pinion rigidly secured to said secondary shaft and meshing with said rack, and a cutter carried by the upper end of said secondary shaft.

3. In a machine of the character described, a batch support comprising a funnel-shaped receptacle open at its upper and lower ends and comprising a series of slightly separated longitudinal sections, strips of resilient material arranged in grooves between the adjacent edges of said longitudinal sections, and means for moving said sections toward and from the longitudinal center of said receptacle.

4. In a machine of the character described, a batch support comprising a conical receptacle open at its upper and lower ends and comprising a series of longitudinal sections, a frame extending about said receptacle, a ring extending about said receptacle and held against vertical movement relative thereto, means for imparting vertical movement to said ring and thereby to the sections of said receptacle, and links connecting said sections to said frame, whereby the vertical movement of said sections will cause the same to move toward or away from the longitudinal center of said receptacle.

5. In a machine of the character described, a batch support comprising a conical receptacle open at its upper and lower ends and comprising a series of longitudinal sections, a ring surrounding said receptacle, means for limiting the movement of said ring relative to said sections, a lever pivotally mounted on a fixed part of said machine and having an annular portion extending about said receptacle, bearings carried by said annular portion, trunnions secured to said ring and mounted in said bearings, means for actuating the free end of said lever, a frame extending about said receptacle, and links connecting said sections to said frame.

6. In a machine of the character described, a batch support comprising a conical receptacle open at its upper and lower ends and comprising a series of longitudinal sections, each of said sections having outwardly extending lugs arranged near the upper and lower ends thereof, frames extending about said receptacle near the upper and lower ends thereof, links pivotally connected at one end to the lugs of the respective sections and pivotally connected at the opposite ends to said frames, a ring surrounding said receptacle and adapted to rest upon the lugs in the lower ends of said sections, stops carried by said sections and extending above said ring, trunnions extending outwardly from the opposite sides of said ring, a lever pivotally mounted at one end on a fixed part of said machine and having an annular portion extending about said receptacle, bearings depending from said annular portion to receive the trunnion of said ring, and means for actuating the free end of said lever.

7. In a machine of the character described, a batch support comprising a conical receptacle open at its upper and lower ends and comprising a series of longitudinal sections, a support mounted on a fixed part of said machine and surrounding the lower portion of said receptacle, a second support extending about said receptacle above the first-mentioned support, means for imparting vertical movement to the sections of said receptacle, standards carried by the last-mentioned support, an annular frame carried by said standards, and a hopper carried by said frame and arranged in alinement with said receptacle.

8. In a machine of the character described, a batch support comprising a conical receptacle open at its upper and lower ends and comprising a series of longitudinal sections, a support mounted on a fixed part of said machine and surrounding the lower portion of said receptacle, a second support extending about said receptacle above the first-mentioned support, rods connecting said second support to said first support, means for imparting vertical movement to the sections of said receptacle, standards carried by the last-mentioned support, an annular frame carried by said standards, a hopper carried by said frame, held against vertical movement and having its lower end in alinement with the upper end of said receptacle, and a soft rubber gasket interposed between said hopper and the lower end of said receptacle.

9. In a machine of the character described, the combination, with a batch support, of a reducing and feeding device comprising a horizontal frame, a plurality of pairs of rollers arranged on one side of said frame and having their peripheries grooved to form passages between the adjacent edges of the rollers of each pair, shafts journaled in said frame and supporting said rollers, and means for rotating said shafts, that portion of said frame carrying the last pair of rollers being pivotally connected to the main portion of said frame.

10. In a machine of the character described, the combination, with a batch support, of a horizontal frame, a pair of shafts journaled in said frame and arranged in substantially the same horizontal plane, grooved rollers carried by said shafts on one side of said frame, means for rotating said rollers in opposite directions, a second pair of shafts journaled in said frame and arranged in substantially the same vertical plane, grooved rollers secured to the ends of said shafts on one side of said frame and in substantial alinement with the first-mentioned rollers, means for rotating said rollers in opposite directions, a third pair of shafts journaled in said frame in substantially the same horizontal plane, rollers secured to the ends of said shafts on one side of said frame and in substantial alinement with the first-mentioned pair of rollers, a cutter arranged adjacent the rollers of the last pair of shafts, and means for imparting an intermittent rotary movement to the last-mentioned pair of rollers.

11. In a machine of the character described, the combination, with a batch support, of a horizontal frame, a plurality of pairs of shafts journaled in said frame, feeding and reducing rollers carried by said shafts, means for continuously rotating a part of said shafts, a ratchet wheel secured to one of said shafts, a rod slidably mounted on said frame, a pawl pivotally connected to said rod and adapted to engage said ratchet, a projection carried by said rod, a vertical shaft having a cam adapted to engage the projection on said rod, a spring to retract said rod, and a cutter arranged adjacent the rollers of the last pair of shafts.

12. In a machine of the character described, a hopper having open upper and lower ends, the lower part of said hopper comprising a series of slightly separated contractible and extensible sections having compressible fillings located in grooves between the same, and means for contracting and extending said sections.

In testimony whereof, we have hereunto set our hands this 24th day of April, 1915.

DENNIS T. IGOU.
DALE C. IGOU.

Witness:
CHAS. I. WELCH.